Aug. 5, 1952     J. KATZMAN     2,606,231
MULTIPLE CHECKING AND INSPECTION DEVICE AND SYSTEM FOR
THE MEASUREMENT OF ELECTRICAL UNITS
Filed Dec. 29, 1945

INVENTOR:
JACOB KATZMAN
BY: Manuel E. Sparrow
ATTORNEY

Patented Aug. 5, 1952

2,606,231

UNITED STATES PATENT OFFICE 2,606,231

MULTIPLE CHECKING AND INSPECTION DEVICE AND SYSTEM FOR THE MEASUREMENT OF ELECTRICAL UNITS

Jacob Katzman, New York, N. Y.

Application December 29, 1945, Serial No. 638,063

2 Claims. (Cl. 175—183)

This invention relates to the checking and inspection of electrical components, including capacitors, inductors, resistors and analogous component of radio, electronic and electrical equipment.

It has always been a problem, in the production of electrical and electronic equipment, to check economically the tolerances and accuracy of such electrical elements as capacitors, resistors and inductances with any degree of accuracy in production.

This invention provides a simple, economical, practical, and efficient means of measurement and test for such purpose.

It is a further purpose of the present invention to provide a multiple checking and inspection device and system for the measurement of electrical units.

Another purpose of the invention is to utilize standard equipment in a system for measuring electrical units.

Other purposes will be in part obvious from the annexed drawing and in part hereinafter indicated in connection there with by the following analysis of this invention.

This invention accordingly consists in the features of construction, combination of parts and in the unique relations of the members and in the relative disposition thereof, all as more completely outlined herein.

To enable others skilled in the art so fully to comprehend the underlying features thereof that they may embody the same by the numerous modifications in structure and relation contemplated by this invention, a drawing depicting certain forms of the invention has been annexed as a part of this disclosure, and in such drawing, like characters of reference denote corresponding parts throughout all the views, of which:

Figure 1:
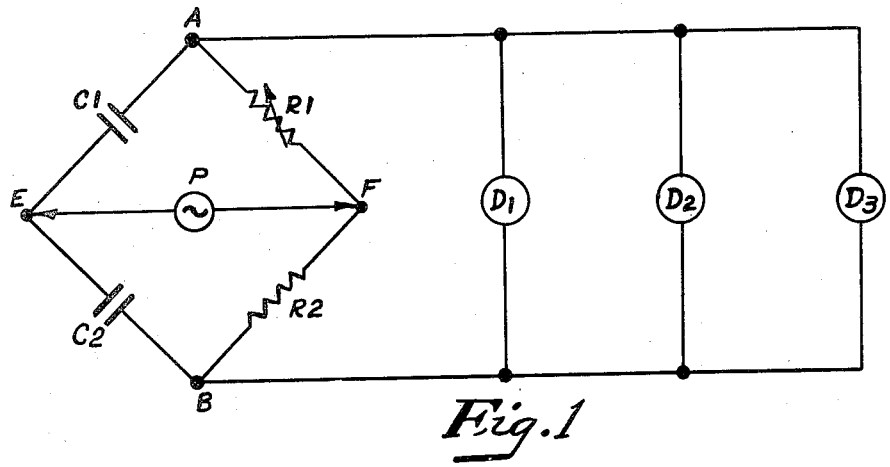
Fig. 1 is a schematic diagram of an electrical system embodying the invention showing three measuring units in parallel.

As appears from Fig. 1, a device embodying the invention in one of its practical forms comprises a bridge circuit, in which the standard arm consists of a fixed condenser C1 in series with a variable resistor R1. The other arm consists of fixed resistor R2, and an unknown capacitor under test C2. The power source P is connected across points E and F.

Across points A and B and in parallel are shown three test units or measuring instruments D1, D2, D3. These may be either meters or visual indicators. One type of visual indicator is schematically shown in Fig. 2 as being in the form of the so-called magic eye, V.

The terminals A and B are connected to the same points as indicated by A and B in Fig. 1.

Figure 2:
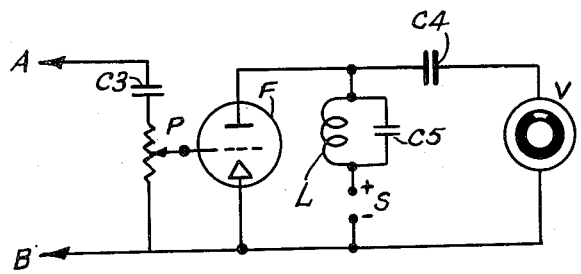
Fig. 2 is a schematic diagram of a visual indicator, employable in the invention.

The schematic diagram Fig. 2 shows a circuit comprising a conventional amplifier and visual indicator circuit, wherein an electron-ray tube V (the so-called magic eye) is used as a detector. A high-gain amplifier and a sharply tuned filter circuit may be employed to obtain substantially maximum sensitivity of the visual indicator. The potentiometer P controls the gain of the amplifier F, and consequently controls the sensitivity of the visual indicator V. C3 indicates a fixed condenser in the potentiometer circuit. C4 and C5 are fixed condensers and L an inductance in the amplifier-detector circuit. The letter S represents the power source in the latter-mentioned circuit.

In utilizing the arrangement shown in Fig. 1, D1 is set or selected to indicate a tolerance of, say, within ±5%; D2 is set or selected to indicate a tolerance of, say, within ±10%; and D3 is set or selected to indicate a tolerance of, say, within ±15%. Thus, when the condenser C2 whose capacitance is to be measured or tested is placed in the bridge, its accuracy within desired ranges may be determined. It is understood that any number of indicators may be placed in parallel across the bridge, as found desired.

Figure 3:
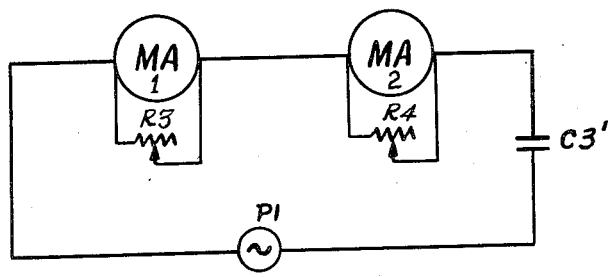
Fig. 3 is a schematic diagram of another system employing two milliammeters connected in series.

Fig. 3 is another example or application of this invention and indicates clearly its utility, simplicity and efficiency for the production testing and tolerance selection of such units. In this figure MA1 and MA2 are milliammeters connected in series, variable resistances R3, R4 being respectively connected across these milliammeters. P1 is the power source; and C3' a fixed condenser the capacitance of which is to be tested or measured. Referring to Fig. 3, for example, to illustrate the workings of such a multiple tester, let us assume a 1,000 cycle power source, P1, then substituting in the following capacitative formula, $$\frac{1}{2\pi fc}$$

C3' under test being assumed to be 1MFD:

$$\frac{1}{2\times 3.14\times 1000\times 1\times 10^{-6}} = \frac{10^6}{6.28\times 10^3}$$

$$\frac{1000}{6.28} = 159 \text{ ohms}$$

In the above example, the supply is assumed at 1000 cycles, the voltage at 159 volts, resulting in 159 ohms impedance, which of course will allow 1 ampere to flow at normal setting.

The first meter MA1 then can be used as an indicator for 5% tolerence test, allowing up to a deflection of 95 to one side and 105 to the other side of the central position of 100; and the other meter, MA-2, can be set up to permit a plus or minus 10% tolerance, deflecting to 90 and 110, on either side of the central point, if it is 100.

It is clear that with the aforementioned arrangements not only the values and tolerances of electrical units may be tested but the units may be selected and grouped all in the same device and at the same time.

Clearly, the value and efficiency of the systems increase with the number of measuring units employed.

Devices and systems made in accordance with this invention afford very efficient, quick and simple checking means having no special adjustments or controls which require constant checking and inspection, and keep manipulation of the equipment at a minimum. They may be employed for checking or testing condenser, resistance, inductance units and other electrical units.

Without further analysis the foregoing will so fully reveal the gist of the invention that others can by applying current knowledge readily adapt it for various applications without omitting certain features that from the standpoint of the prior art fairly constitute essential characteristics of the generic or specific aspects of this invention, and therefore such adaptations should and are intended to be comprehended within the meaning and range of equivalency of the following claims.

Having thus described the invention, what is claimed as new and desired to be secured by Letters Patent, is:

1. A testing circuit for electrical impedance elements whose impedances are apt to fall within one of several predetermined ranges of tolerance centered on a predetermined standard value, said circuit comprising three known impedances forming respective arms of a Wheatstone bridge adapted to have an impedance element to be tested connected as the fourth arm thereof, a source of voltage connected in one diagonal of said bridge, and a plurality of independent voltage-responsive indicators connected in parallel across the other diagonal of said bridge to be responsive to the unbalance of said bridge, the unbalance of said bridge being a function of the deviation of the impedance of said element from the standard, each of said indicators being adapted to give a characteristic indication upon the unbalance of the bridge as a function of the deviation from standard of the impedance of said element falling anywhere within a respective one of said several ranges, whereby each element tested may be classified as to tolerance.

2. A testing circuit for electrical impedance elements whose impedances are apt to fall within one of several predetermined ranges of tolerance centered on a predetermined standard value, said circuit comprising three known impedances forming respective arms of a Wheatstone bridge adapted to have an impedance element to be tested connected as the fourth arm thereof, a source of voltage connected in one diagonal of said bridge, and a plurality of independent electron ray tubes of the magic eye types having their inputs connected in parallel across the other diagonal of said bridge, to be responsive to the unbalance of said bridge, the unbalance of said bridge being a function of the deviation of the impedance of said element from the standard, each of said tubes being adapted to give a characteristic visual indication upon the unbalance of said bridge as a function of the deviation from standard of the impedance of said element falling anywhere within a respective one of said several ranges, whereby each element tested may be classified as to tolerance.

JACOB KATZMAN.

REFERENCES CITED

The following references are of record in the file of this patent:

UNITED STATES PATENTS

| Number | Name | Date |
|---|---|---|
| 1,665,397 | Wunsch | Apr. 10, 1928 |
| 1,743,386 | Paulson | Jan. 14, 1930 |
| 1,744,840 | Strieby et al. | Jan. 28, 1930 |
| 1,951,461 | Wilson | Mar. 20, 1934 |
| 2,122,267 | Wagner | June 28, 1938 |
| 2,132,214 | Myers | Oct. 4, 1938 |
| 2,235,173 | Shepard, Jr. | Mar. 18, 1941 |
| 2,272,849 | Perkins | Feb. 10, 1942 |
| 2,319,413 | Leathers et al. | May 18, 1943 |
| 2,331,418 | Nolde | Oct. 12, 1943 |
| 2,354,592 | Goodale | July 25, 1944 |
| 2,369,070 | Nielsen | Feb. 6, 1945 |
| 2,380,439 | Hoskins et al. | July 31, 1945 |
| 2,479,051 | Sunstein | Aug. 16, 1949 |

OTHER REFERENCES

Radio News, Oct. 1944, pages 40, 41, 100, 102, 104.